United States Patent
Barlow et al.

(10) Patent No.: US 9,202,517 B1
(45) Date of Patent: Dec. 1, 2015

(54) DISK DRIVE CALIBRATING DEFECT THRESHOLD BASED ON STATISTICAL QUALITY METRIC MEASURED FOR REFERENCE TRACKS

(71) Applicant: Western Digital Technologies, Inc., Irvine, CA (US)

(72) Inventors: Carl E. Barlow, Lake Forest, CA (US); Chirag C. Patel, Rancho Santa Margarita, CA (US); Andrew W. Fok, Fullerton, CA (US); Chun Sei Tsai, Tustin, CA (US); Donald Brunnett, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/762,850

(22) Filed: Feb. 8, 2013

(51) Int. Cl.
*G11B 20/18* (2006.01)

(52) U.S. Cl.
CPC .................................. *G11B 20/1816* (2013.01)

(58) Field of Classification Search
None
See application file for complete search history.

(56) References Cited

U.S. PATENT DOCUMENTS

| | | | |
|---|---|---|---|
| 5,150,050 A | 9/1992 | Genheimer et al. | |
| 6,204,660 B1 | 3/2001 | Lee | |
| 6,281,676 B1 | 8/2001 | Ottesen et al. | |
| 6,876,445 B2 | 4/2005 | Shibuya et al. | |
| 7,139,145 B1 | 11/2006 | Archibald et al. | |
| 7,583,461 B2 | 9/2009 | Kudoh et al. | |
| 7,656,763 B1 * | 2/2010 | Jin et al. ..................... | 369/53.15 |
| 7,952,826 B2 | 5/2011 | Youlian et al. | |
| 8,094,396 B1 * | 1/2012 | Zhang et al. .................... | 360/31 |
| 8,169,725 B2 | 5/2012 | Jun | |
| 8,335,048 B2 * | 12/2012 | Yun et al. ........................ | 360/53 |
| 2011/0141599 A1 * | 6/2011 | Yasuna et al. ................... | 360/31 |
| 2012/0092975 A1 * | 4/2012 | Jun ................................ | 369/43 |

* cited by examiner

*Primary Examiner* — Wayne Young
*Assistant Examiner* — Mark Fischer

(57) ABSTRACT

A disk drive is disclosed comprising a head actuated over a disk comprising a plurality of data tracks. First data is written to a first data track, and the first data is read from the first data track to measure a first quality metric representing a recording quality of the first data. Second data is written to a second data track, and the second data is read from the second data track to measure a second quality metric representing a recording quality of the second data. The first and second quality metrics are processed to generate a first statistical quality metric. A first defect threshold is generated based on the first statistical quality metric, and at least part of the disk is scanned for defects based on the first defect threshold.

20 Claims, 4 Drawing Sheets

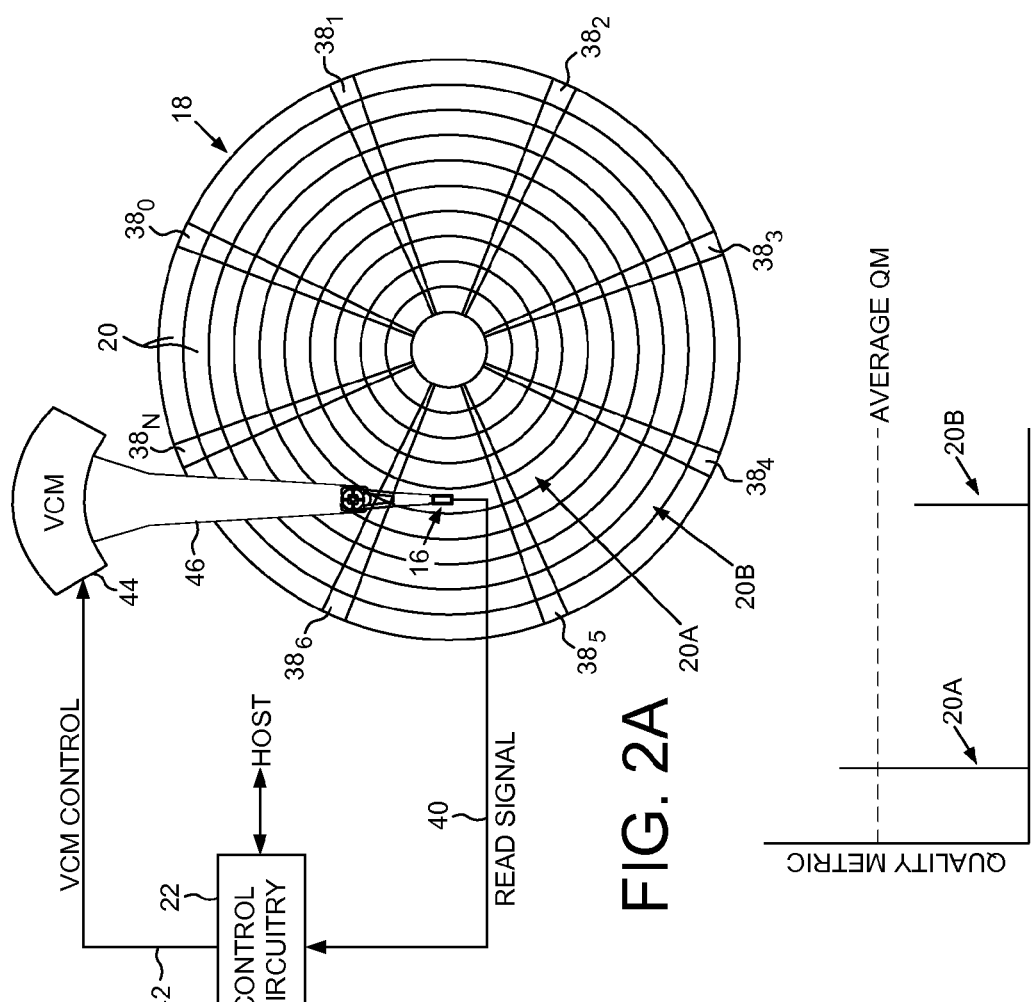
FIG. 2A
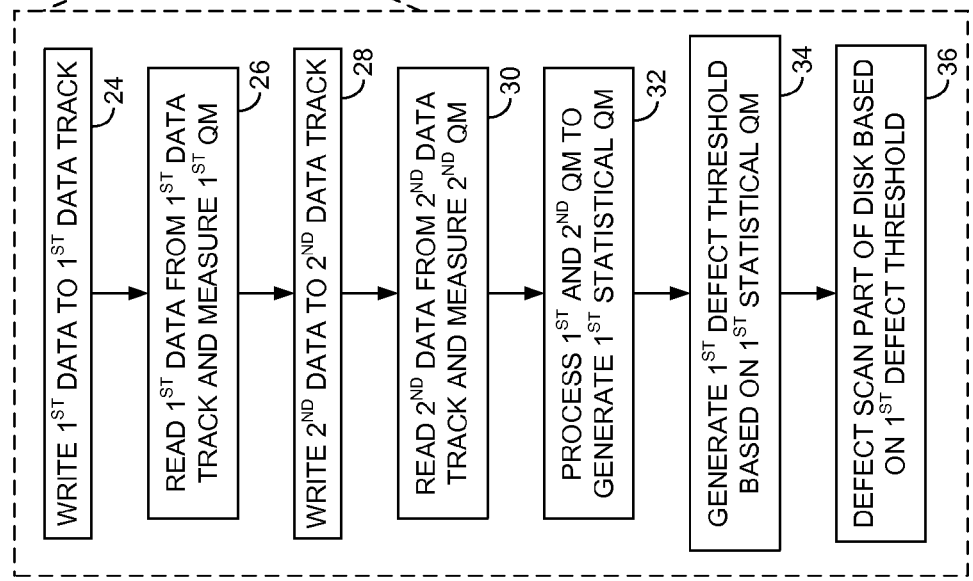
FIG. 2C
FIG. 2B

DISK DRIVE CALIBRATING DEFECT THRESHOLD BASED ON STATISTICAL QUALITY METRIC MEASURED FOR REFERENCE TRACKS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (A, B, C, D in the example shown), which are recorded with precise intervals and offsets relative to the servo track centerlines. The servo bursts 14 provide fine head position information used for centerline tracking while accessing a data track during write/read operations.

The data sectors in the data tracks are accessed indirectly using logical block addresses (LBAs) mapped to physical block addresses (PBAs) representing the physical location of each data sector. This indirect accessing facilitates mapping out defective data sectors during manufacturing as well as while the disk drive is deployed in the field. When scanning for defective data sectors during manufacturing, it is desirable to use a defect threshold that increases the probability of detecting and mapping out truly defective data sectors. It is also desirable to minimize the number of data sectors falsely detected as defective so as to minimize the number of data sectors that are mapped out unnecessarily.

BRIEF DESCRIPTION OF THE DRAWINGS

FIG. 2A shows an embodiment of a disk drive comprising a head actuated over a disk comprising a plurality of data tracks defined relative to the servo tracks.

FIG. 2B is a flow diagram according to an embodiment wherein a plurality of data tracks are evaluated in order to generate a defect threshold used to detect defective data sectors on the disk.

FIG. 2C illustrates an embodiment wherein first and second data tracks, separated radially, are evaluated to generate the defect threshold.

DETAILED DESCRIPTION

Figure 1:
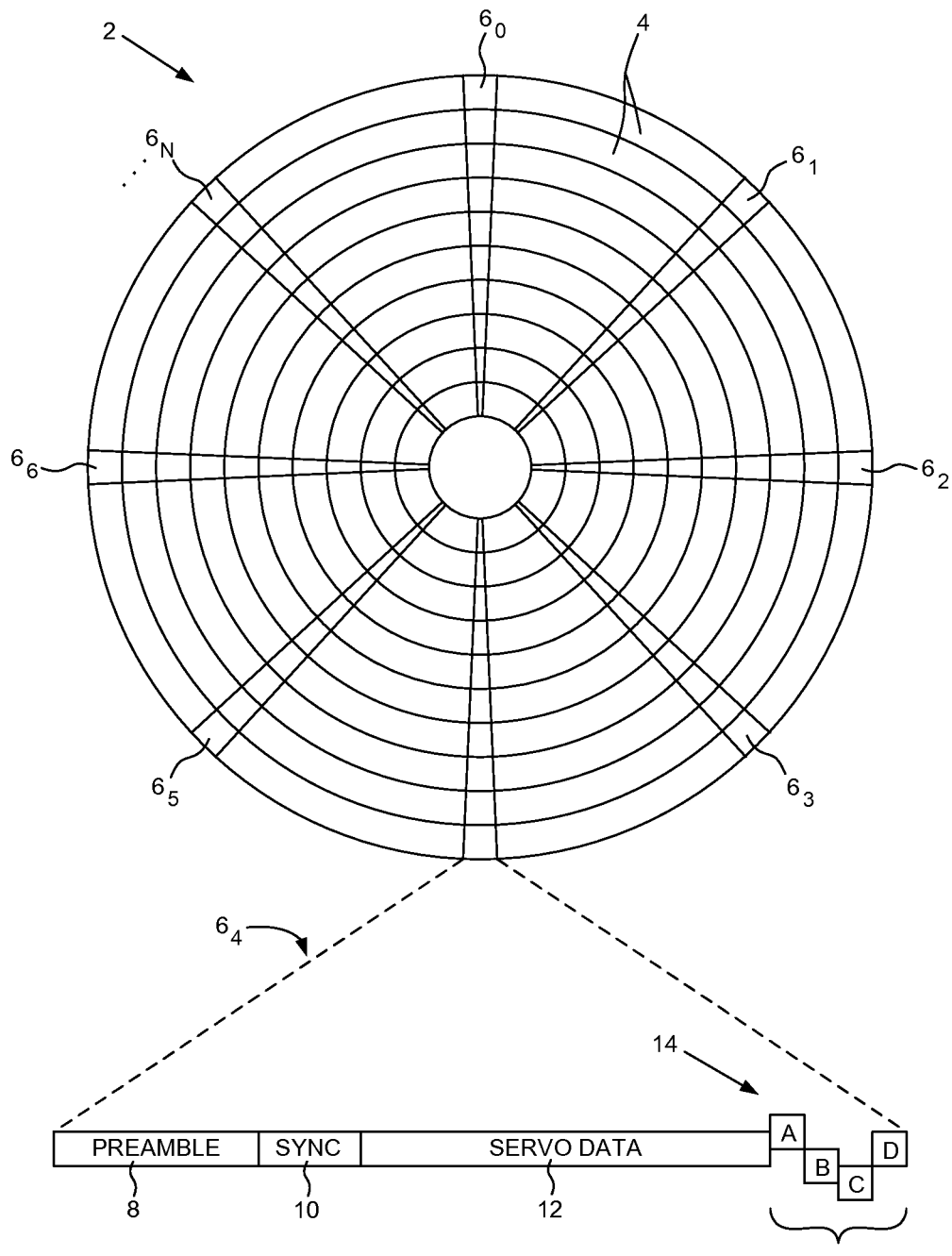
FIG. 1 is a prior art disk format comprising a plurality of servo tracks defined by servo sectors.

FIG. 2A shows a disk drive according to an embodiment comprising a head 16 actuated over a disk 18 comprising a plurality of data tracks 20, and control circuitry 22 operable to execute the flow diagram of FIG. 2B. First data is written to a first data track 20A (block 24), and the first data is read from the first data track 20A to measure a first quality metric representing a recording quality of the first data (block 26). Second data is written to a second data track 20B (block 28), and the second data is read from the second data track 20B to measure a second quality metric representing a recording quality of the second data (block 30). The first and second quality metrics are processed to generate a first statistical quality metric (block 32). A first defect threshold is generated based on the first statistical quality metric (block 34), and at least part of the disk is scanned for defects based on the first defect threshold (block 36).

In the embodiment of FIG. 2A, the disk 18 comprises embedded servo sectors $38_0$-$38_N$ that define a plurality of servo tracks, wherein the data tracks 20 are defined relative to the servo tracks at the same or different radial density. The control circuitry 22 processes a read signal 40 emanating from the head 16 to demodulate the servo sectors $38_0$-$38_N$ and generate a position error signal (PES) representing an error between the actual position of the head and a target position relative to a target track. The control circuitry 22 filters the PES using a suitable compensation filter to generate a control signal 42 applied to a voice coil motor (VCM) 44 which rotates an actuator arm 46 about a pivot in order to actuate the head 16 radially over the disk in a direction that reduces the PES. The servo sectors $38_0$-$38_N$ may comprise any suitable position information, such as a track address for coarse positioning and servo bursts for fine positioning. The servo bursts may comprise any suitable pattern, such as the amplitude-based servo pattern, or a suitable phase-based servo pattern.

In one embodiment, each data track 20 comprises a plurality of data sectors, wherein the control circuitry 22 scans the data sectors to detect defects so that the defective data sectors may be mapped out. In some embodiments, a defect threshold is calibrated that optimizes the defect scan in terms of accurately detecting the data sectors that will likely become unrecoverable due to defects on the disk. In one embodiment, it is assumed that some percentage of the data sectors on the disk are defective and therefore should be mapped out during the defect scan. A defect threshold is therefore generated that ensures at least a certain percentage of the data sectors are mapped out as defective. In one embodiment, a plurality of the data tracks is evaluated to generate a statistical sampling, and the defect threshold is generated based on this statistical sampling. In an embodiment described below, the defect threshold may be generated by adding a margin to the average quality metric, such as by adding a number of standard deviations to the average of the quality metrics generated for the plurality of data tracks.

FIG. 2C shows an example embodiment wherein a quality metric is generated for a first data track 20A and a second data track 20B that are separated by a plurality of data tracks. In one embodiment, a quality metric is generated for each data sector in each of the first and second data tracks, and an average quality metric generated for each of the data tracks. The average quality metric generated for each data track is then processed to generate a statistical quality metric for at least part of the disk surface as illustrated in FIG. 2C.

Any suitable statistical quality metric may be generated at block 32 of FIG. 2B, wherein in the embodiment of FIG. 2C, an average quality metric is generated by averaging the first quality metric generated for data track 20A and the second quality metric generated for data track 20B. Other embodiments may apply a different statistical analysis to the first and second quality metrics, such as by computing a weighted average. For example, data tracks near the middle diameter of the disk may be more reliably accessed due to a zero skew angle of the head and therefore the corresponding quality metric may be weighted different from the quality metrics generated for a data track toward the outer or inner diameter of the disk.

In one embodiment, a defect threshold is generated based on the statistical quality metric, such as by adding a suitable margin to the average quality metric. The defect threshold is then used to map out defective data sectors in the first and second data tracks 20A and 20B, as well as defective data sectors in at least one other data track. In the example of FIG. 2C, the average quality metric is generated by evaluating two data tracks, but other embodiments may generate the average quality metric by evaluating a larger sampling of data tracks.

Figure 3:
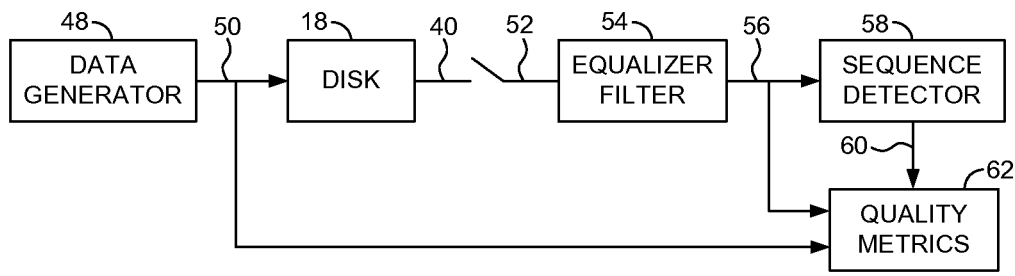
FIG. 3 shows control circuitry according to an embodiment for implementing the flow diagram of FIG. 2B.

FIG. 3 shows example control circuitry, according to one embodiment, for generating the defect threshold used for the defect scan. A data generator 48 generates data 50 written to a data track on the disk 18. The data is read from the data track to generate the read signal 40 which is sampled to generate signal samples 52. The signal samples 52 are equalized by an equalizer filter 54 according to a suitable response (e.g., a partial response) to generate equalized samples 56. A sequence detector 58 processes the equalized samples 56 to detect an estimated data sequence 60. A quality metrics block 62 evaluates any suitable signals to generate any suitable quality metric for each data sector in the data track.

In the example of FIG. 3, the quality metrics block 62 evaluates the data 50 generated by the data generator 48, the equalized samples 56, and the estimate data sequence 60 output by the sequence detector 58. One or more quality metrics are then measured, such as the number of bit errors in the estimated data sequence 60 relative to the data 50 that was written to the data track. Other embodiments may generate the quality metric by measuring a noise power in the equalized samples 56. The noise in the equalized samples 56 may be generated as the difference between the equalized samples 56 and expected samples generated based on the data 50 written to the data track. In another embodiment, the quality metric may be measured as a number of errors corrected by the sequence detector 58 (which may include a Viterbi type sequence detector, and/or an iterative detector, and/or an error correction code decoder, etc.), where each error may comprise one or more bits. In one embodiment, the sequence detector 58 comprises a suitable iterative detector (e.g., a turbo code decoder, or a low density parity check code decoder), and the quality metric comprises a number of iterations required to accurately recover the data 50 written to the data track.

The quality metric measured by the quality metrics block 62 represents a quality of the data sector, which represents a likelihood that the data sector may become unrecoverable in the future. For example, if the number of bit errors (or number of iterations) is near a maximum for the sequence detector 58, then the data sector will likely become unrecoverable in the future and may be mapped out as defective. Accordingly, in some embodiments a defect threshold is generated based on the quality metrics measured for at least two data tracks, and then defective data sectors are detected during the defect scan by comparing the quality metric of each data sector to the defect threshold.

Figure 4:
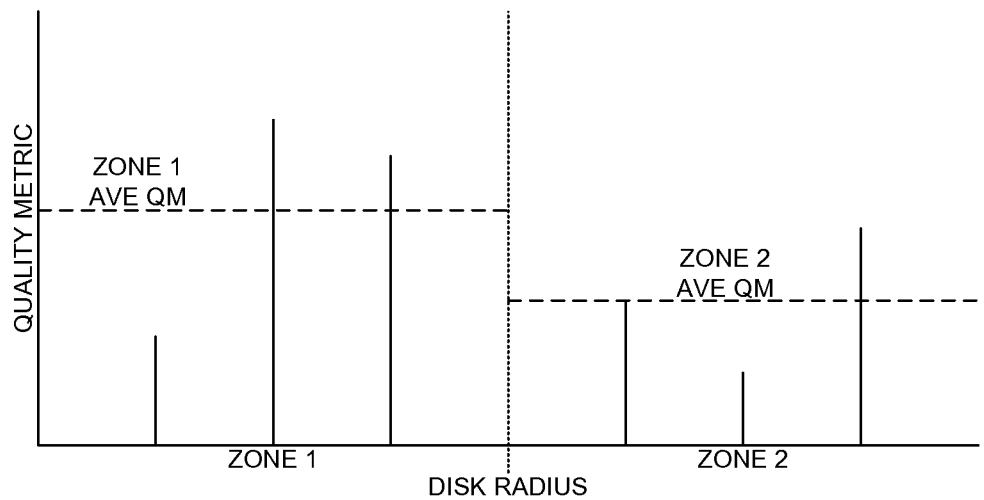
FIG. 4 shows an embodiment wherein the tracks are grouped to define a plurality of zones, and a defect threshold is generated for each zone.

FIG. 4 shows an embodiment wherein the control circuitry 22 is operable to define a plurality of zones on the disk, such as the first and second zones shown in FIG. 4. In some embodiments, each zone comprises a plurality of the data tracks over a radial segment of the disk. The control circuitry 22 evaluates the quality metrics for a number of radially separated data tracks in each zone, wherein three data tracks are evaluated in the example of FIG. 4, in order to generate an average quality metric for each zone. A defect threshold can then be generated for each zone based on the average quality metric for each zone. Any suitable number of zones may be defined across the disk surface, wherein the number of zones per disk surface may vary depending on any suitable metric, such as a standard deviation of the quality metrics measured for the sample data tracks across the entire disk surface. For example, if the standard deviation of the quality metrics exceeds a nominal value, the control circuitry may define a larger number of zones across the disk surface. In yet another embodiment, the width of each zone may be defined relative to a delta and/or a derivative of the standard deviation. For example, the width of each zone may be increased until the delta and/or derivative of the standard deviation over a predetermined window exceeds a threshold, after which a new zone may begin.

Figure 5:
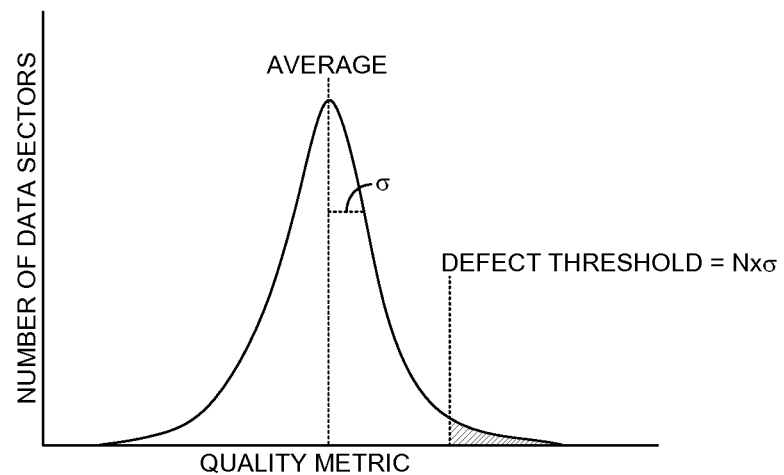
FIG. 5 shows an embodiment wherein the defect threshold is generated by adding a margin to an average quality metric.

FIG. 5 shows a histogram according to an embodiment which represents the distribution of quality metrics measured for a plurality of data sectors evaluated in a plurality of data tracks (i.e., the sample data tracks). In one embodiment, the defect threshold is generated as N standard deviations above the average quality metric, such that the number of data sectors shown in the shaded area are mapped out as defective. A similar percentage of data sectors will also be mapped out as defective across the radius of the disk represented by each corresponding defect threshold.

Figure 6:
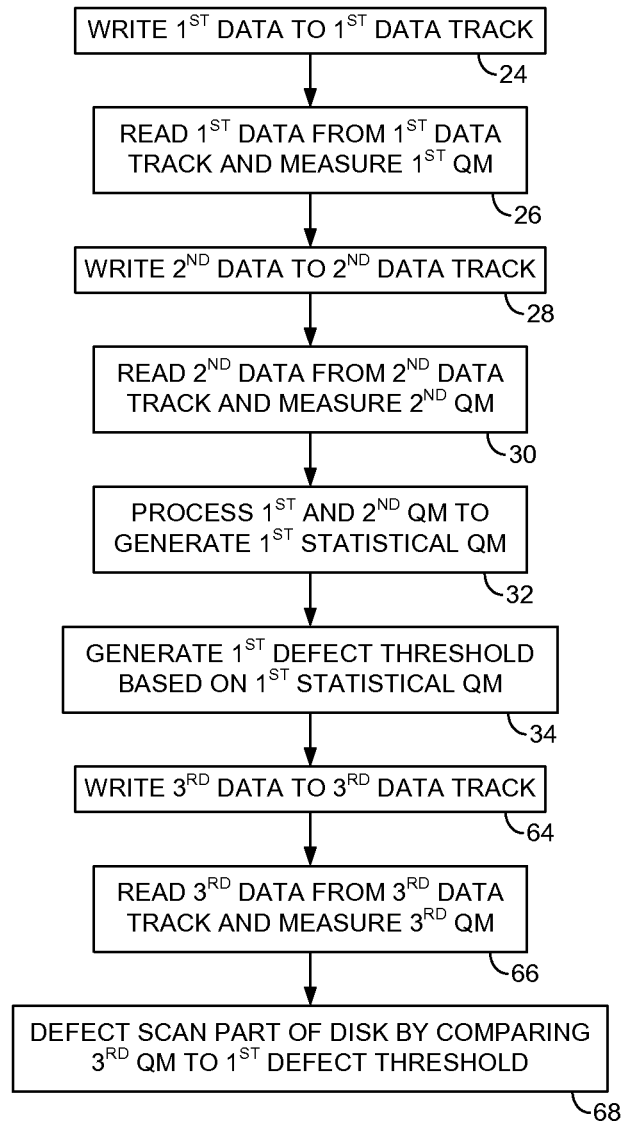
FIG. 6 is a flow diagram according to an embodiment wherein first and second data tracks are evaluated to generate a defect threshold, and a third data track is scanned for defective data sectors using the defect threshold.

FIG. 6 is a flow diagram according to an embodiment which extends on the flow diagram of FIG. 2B. After evaluating the quality metrics for first and second data tracks, and generating the defect threshold based on the average quality metric (block 34), the control circuitry 22 performs the defect scan of at least part of the disk by writing data to a third data track (block 64), reading the third data track to generate a quality metric for each servo sector (block 66), and detecting defective data sectors when the corresponding quality metric exceeds the defect threshold (block 68). The defect scan is executed for each data track corresponding to the defect threshold, such as each data track of a particular disk surface, and/or each data track in each zone of a disk surface.

When evaluating the sample data tracks to generate the statistical quality metric, the data may be written and read from each data track in any suitable order. In one embodiment, each sample data track is written and read in sequence, and in another embodiment, all of the sample data tracks are written and then all of the sample data tracks are read to generate the corresponding quality metrics.

In one embodiment, each sample data track may be qualified prior to including the corresponding quality metrics in the calculation for the average quality metric. For example, if a sample data track comprises an excessive number of unrecoverable data sectors, then the sample data track may be ignored (as an outlier) when computing the average quality metric. In one embodiment, a different sample data track may be selected in place of an outlier data track (e.g., near the outlier data track) in order to generate the average quality metric. In another embodiment, when a data sector within a sample data track is unrecoverable (i.e., the data cannot be recovered from the data sector), the corresponding quality metric for the data sector may be ignored or set to a maximum value when generating the average quality metric for the sample data track.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

As will be apparent, many variations on the systems and methods described above are possible. For example, while the above disclosure has described processes as performed for "each" sector, zone or other disk portion, in some cases, the processes may be performed for only one or some of the disk portions and not necessarily for each of the disk portions.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk comprising a plurality of data tracks;
   a head; and
   control circuitry operable to:
      write first data to a first data track;
      read the first data from the first data track and measure a first quality metric representing a recording quality of the first data;
      write second data to a second data track;
      read the second data from the second data track and measure a second quality metric representing a recording quality of the second data;
      process the first and second quality metrics to generate a first statistical quality metric comprising an average of the first and second quality metrics;
      generate a first defect threshold by adding a margin to the first statistical quality metric; and
      scan at least part of the disk for defects based on the first defect threshold.

2. The disk drive as recited in claim 1, wherein the first quality metric and the second quality metric comprises a number of errors detected in the first and second data.

3. The disk drive as recited in claim 1, wherein the first quality metric and the second quality metric comprises a number of errors corrected in the first and second data.

4. The disk drive as recited in claim 1, wherein the first quality metric and the second quality metric comprises an iteration count of an iterative detector used to detect the first and second data.

5. The disk drive as recited in claim 1, wherein the first and second data tracks are separated by a plurality of data tracks.

6. The disk drive as recited in claim 5, wherein:
   the control circuitry is further operable to define a plurality of zones on the disk including a first zone and a second zone, wherein each zone comprises a plurality of the data tracks;
   the first and second data tracks are located within the first zone; and
   the control circuitry is operable to scan the first zone for defects based on the first defect threshold.

7. The disk drive as recited in claim 6, wherein the control circuitry is further operable to:
   write third data to a third data track in the second zone;
   read the third data from the third data track and measure a third quality metric representing a recording quality of the third data;
   write fourth data to a fourth data track in the second zone;
   read the fourth data from the fourth data track and measure a fourth quality metric representing a recording quality of the fourth data;
   process the third and fourth quality metrics to generate a second statistical quality metric;
   generate a second defect threshold based on the second statistical quality metric, wherein the second defect threshold is different from the first defect threshold;
   scan only the first zone for defects by generating a fifth quality metric for the first zone and comparing the fifth quality metric to the first defect threshold; and
   scan only the second zone for defects by generating a sixth quality metric for the second zone and comparing the sixth quality metric to the second defect threshold.

8. The disk drive as recited in claim 1, wherein the margin comprises at least one standard deviation of a plurality of quality metrics generated for a plurality of data tracks.

9. The disk drive as recited in claim 1, wherein the control circuitry is further operable to scan at least part of the disk for defects by:
  writing third data to a third data track;
  reading the third data from the third data track and measuring a third quality metric representing a recording quality of the third data; and
  comparing the third quality metric to the first defect threshold.

10. A method of operating a disk drive comprising a head actuated over a disk comprising a plurality of data tracks, the method comprising:
  writing first data to a first data track;
  reading the first data from the first data track and measuring a first quality metric representing a recording quality of the first data;
  writing second data to a second data track;
  reading the second data from the second data track and measuring a second quality metric representing a recording quality of the second data;
  processing the first and second quality metrics to generate a first statistical quality metric comprising an average of the first and second quality metrics;
  generating a first defect threshold by adding a margin to the first statistical quality metric; and
  scanning at least part of the disk for defects based on the first defect threshold.

11. The method as recited in claim 10, wherein the first quality metric and the second quality metric comprises a number of errors detected in the first and second data.

12. The method as recited in claim 10, wherein the first quality metric and the second quality metric comprises a number of errors corrected in the first and second data.

13. The method as recited in claim 10, wherein the first quality metric and the second quality metric comprises an iteration count of an iterative detector used to detect the first and second data.

14. The method as recited in claim 10, wherein the first and second data tracks are separated by a plurality of data tracks.

15. The method as recited in claim 14, wherein:
  the method further comprises defining a plurality of zones on the disk including a first zone and a second zone, wherein each zone comprises a plurality of the data tracks;
  the first and second data tracks are located within the first zone; and
  the method further comprises scanning the first zone for defects based on the first defect threshold.

16. The method as recited in claim 15, further comprising:
  writing third data to a third data track in the second zone;
  reading the third data from the third data track and measuring a third quality metric representing a recording quality of the third data;
  writing fourth data to a fourth data track in the second zone;
  reading the fourth data from the fourth data track and measuring a fourth quality metric representing a recording quality of the fourth data;
  processing the third and fourth quality metrics to generate a second statistical quality metric;
  generating a second defect threshold based on the second statistical quality metric, wherein the second defect threshold is different from the first defect threshold; and
  scanning only the first zone for defects by generating a fifth quality metric for the first zone and comparing the fifth quality metric to the first defect threshold; and
  scanning only the second zone for defects by generating a sixth quality metric for the second zone and comparing the sixth quality metric to the second defect threshold.

17. The method as recited in claim 10, wherein the margin comprises at least one standard deviation of a plurality of quality metrics generated for a plurality of data tracks.

18. The method as recited in claim 10, further comprising scanning at least part of the disk for defects by:
  writing third data to a third data track;
  reading the third data from the third data track and measuring a third quality metric representing a recording quality of the third data; and
  comparing the third quality metric to the first defect threshold.

19. A disk drive comprising:
  a disk comprising a plurality of data tracks;
  a head; and
  control circuitry operable to:
    write first data to a first data track;
    read the first data from the first data track and measure a first quality metric representing a recording quality of the first data;
    write second data to a second data track;
    read the second data from the second data track and measure a second quality metric representing a recording quality of the second data;
    process the first and second quality metrics to generate a first statistical quality metric;
    generate a first defect threshold based on the first statistical quality metric;
    define a plurality of zones on the disk including a first zone and a second zone, wherein each zone comprises a plurality of the data tracks, wherein the first and second data tracks are located within the first zone;
    scan only the first zone for defects by generating a fifth quality metric for the first zone and comparing the fifth quality metric to the first defect threshold;
    write third data to a third data track in the second zone;
    read the third data from the third data track and measure a third quality metric representing a recording quality of the third data;
    write fourth data to a fourth data track in the second zone;
    read the fourth data from the fourth data track and measure a fourth quality metric representing a recording quality of the fourth data;
    process the third and fourth quality metrics to generate a second statistical quality metric;
    generate a second defect threshold based on the second statistical quality metric, wherein the second defect threshold is different from the first defect threshold; and
    scan only the second zone for defects by generating a sixth quality metric for the second zone and comparing the sixth quality metric to the second defect threshold.

20. A method of operating a disk drive comprising a head actuated over a disk comprising a plurality of data tracks, the method comprising:
  writing first data to a first data track;
  reading the first data from the first data track and measuring a first quality metric representing a recording quality of the first data;
  writing second data to a second data track;
  reading the second data from the second data track and measuring a second quality metric representing a recording quality of the second data;

processing the first and second quality metrics to generate a first statistical quality metric;
generating a first defect threshold based on the first statistical quality metric; and
defining a plurality of zones on the disk including a first zone and a second zone, wherein each zone comprises a plurality of the data tracks, wherein the first and second data tracks are located within the first zone;
scanning only the first zone for defects by generating a fifth quality metric for the first zone and comparing the fifth quality metric to the first defect threshold;
writing third data to a third data track in the second zone;
reading the third data from the third data track and measuring a third quality metric representing a recording quality of the third data;
writing fourth data to a fourth data track in the second zone;
reading the fourth data from the fourth data track and measuring a fourth quality metric representing a recording quality of the fourth data;
processing the third and fourth quality metrics to generate a second statistical quality metric;
generating a second defect threshold based on the second statistical quality metric, wherein the second defect threshold is different from the first defect threshold; and
scanning only the second zone for defects by generating a sixth quality metric for the second zone and comparing the sixth quality metric to the second defect threshold.

* * * * *